United States Patent Office 2,751,472
Patented June 19, 1956

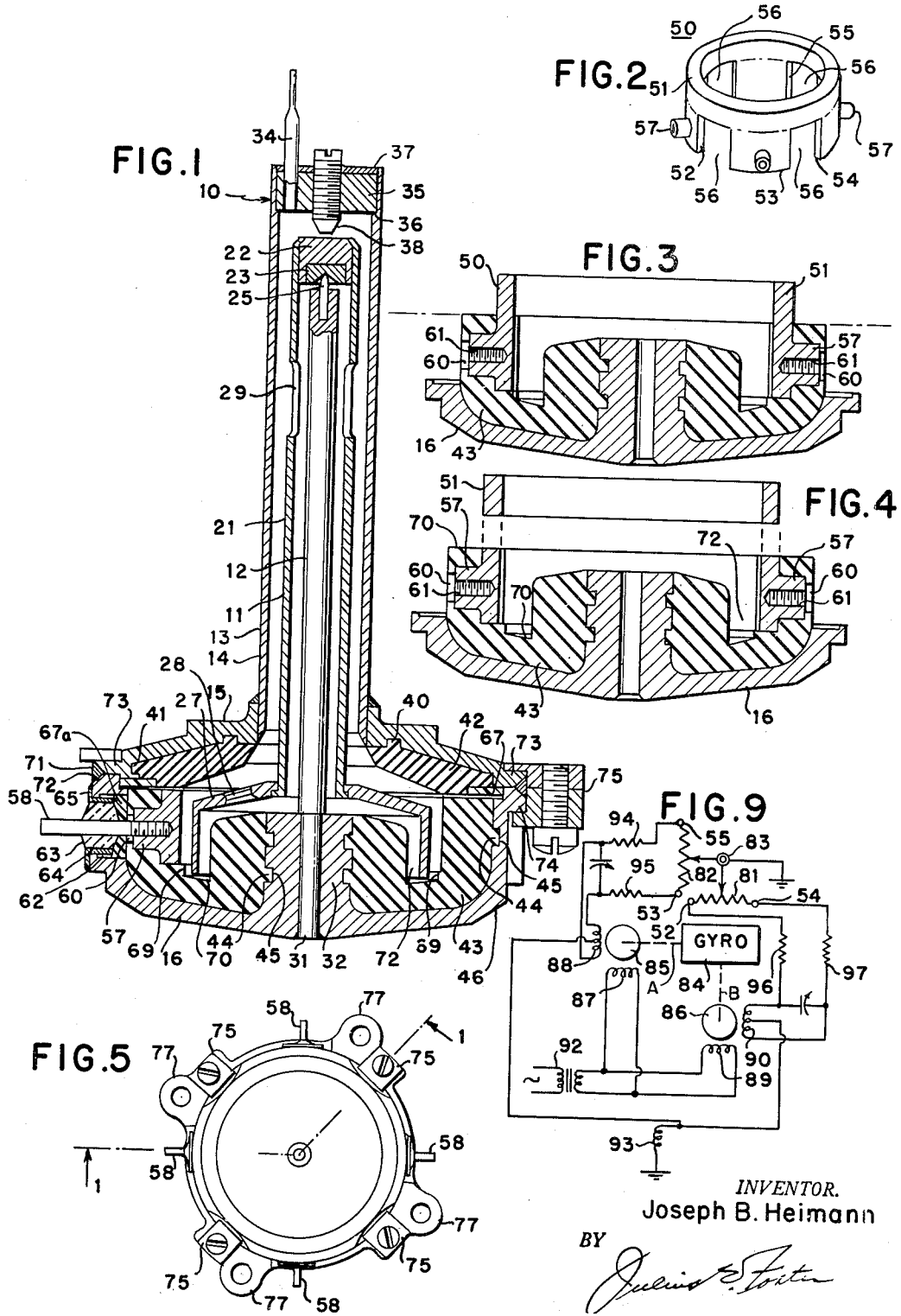

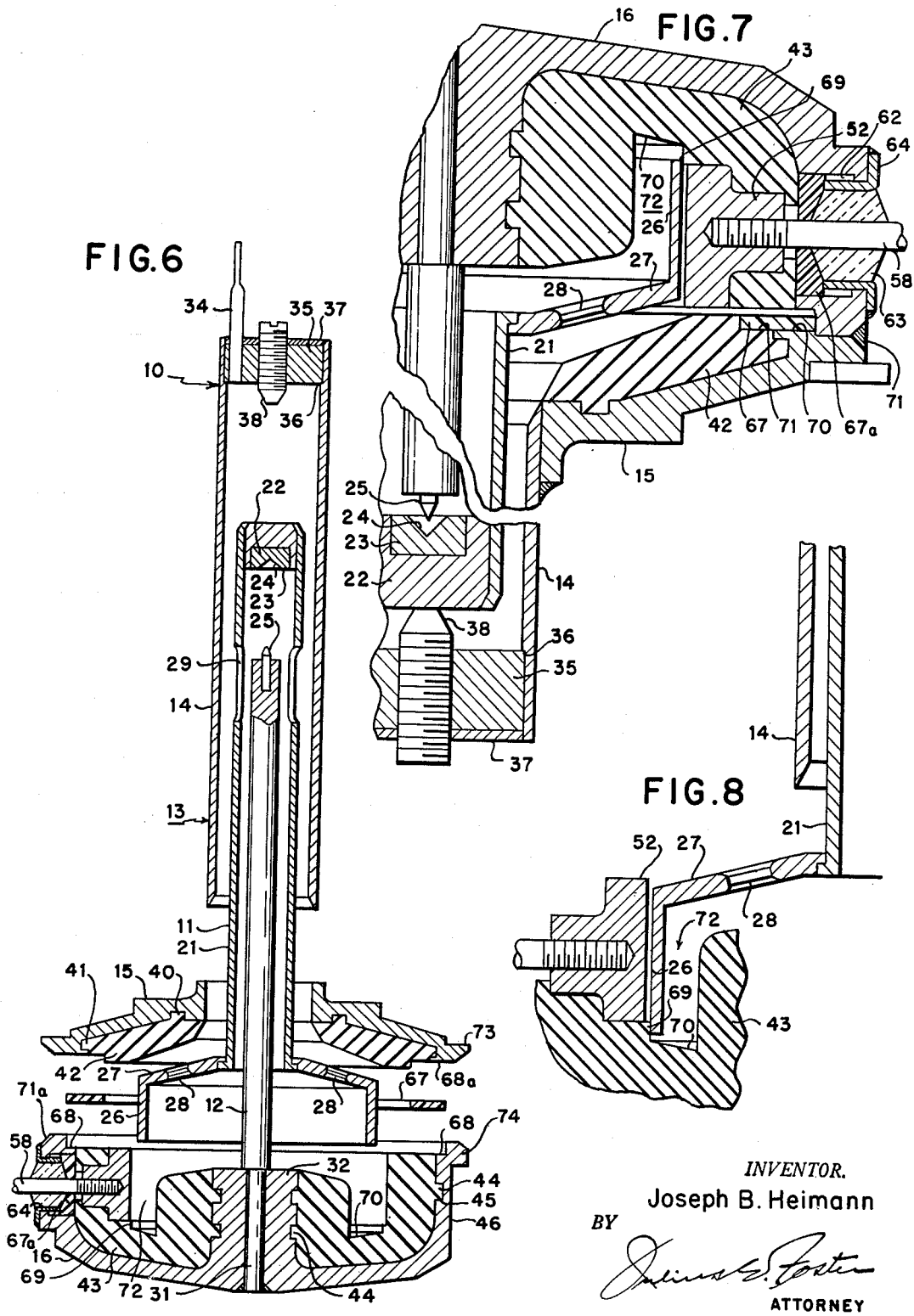

2,751,472

POTENTIOMETER FOR VERTICAL REFERENCE SYSTEM

Joseph B. Heimann, River Edge, N. J., assignor to Kearfott Company, Inc., Little Falls, N. J., a corporation of New York Application July 7, 1953, Serial No. 366,569

12 Claims. (Cl. 201—48)

This invention relates to vertical reference systems, and particularly to a pendulous potentiometer device that is suitably adapted to control the operation of gyro-erecting motors for a vertical gyro.

An object of the invention is to provide a device having a pendulum construction that will establish a vertical reference wherein the pendulum is generally free to move within a range limited only by construction dimensions, and controls an external erecting force generally in proportion to any displacement of the pendulum from true vertical, within said range, and wherein the pendulum is damped by immersion of the moving parts in a suitable fluid so as to prevent too rapid a response to acceleration and deceleration force.

Another object is to provide a pendulous erecting system which has its vertical seeking components sealed in a chamber containing a fluid damping medium.

A further object is to provide a simple and compact erecting system which may be easily applied to be contained physically within an axial chamber of a gyro rotor.

Another object of this invention is to provide a gyro-erecting switching device that may be employed to control directly the current to be supplied to the gyro-erecting motors.

Another object of this invention is to provide a pendulous vertical erecting system which has its vertical seeking components sealed in a chamber containing a fluid that serves both as a damping medium, and as a fluid electrical resistor of relatively high value, in order to permit a potentiometer circuit to be established across a predetermined path through the electrolyte, with the pendulum serving as a take-off terminal for that potentiometer circuit.

In accordance with this invention a pendulum-controlled potentiometer has an electrolyte confined in a symmetrical circular chamber with two co-ordinate resistance paths established through the electrolyte, by two pairs of transversely disposed contact members, to constitute two potentiometer circuits, with the pendulum serving as a contact terminal disposed symmetrically at the intersection of those two potentiometer circuit paths in the normal vertical position of the pendulum, and serving, upon displacement from its normal position, to derive a voltage proportional to the displacement of the pendulum and dependent upon the direction of the displacement of the pendulum from its normal vertical.

Another object of this invention is to provide such a gyro-erecting potetniometer in which the two co-ordinate or perpendicularly disposed electrical conducting paths may be established by means of two pairs of diametrically opposite contacts disposed transversely to each other, and in the manufacture of which a novel method is used for assembling and anchoring the contacts in a common insulating support to assure maximum accuracy in the angular and spatial alignment and disposition of the contacts, with their front surfaces accurately located in a true cylindrical plane.

The manner in which the vertical erecting potentiometer is constructed and assembled, and the control circuit whereby the potentiometer controls the gyro-erecting motors, are illustrated in the accompanying drawings, in which Figure 1 is a vertical sectional view of an assembled vertical-erecting pendulum device embodying this invention;

Figure 2 is a perspective view of a contact ring assembly that is to furnish the contact elements to be integrated into the potentiometer and shows the ring assembly in its initial condition before it is assembled into the potentiometer and before the individual contact elements are electrically separated;

Figure 3 is a vertical section showing the contact ring assembly of Figure 2 anchored in position in an insulating wall that serves as a liner for a cup to contain the electrolyte, and shows the parting line above which the continuous ring portion of the contact ring assembly is to be removed;

Figure 4 is a view similar to Figure 3, and shows the top ring portion of the contact ring assembly removed after a suitable machining operation, to leave the individual contact elements anchored accurately in position in the insulating liner of the cup;

Figure 5 is a bottom view, on a smaller scale, of the entire vertical erecting device of Figure 1, and indicates the discontinuous sectional plan I—I along which Figure 1 is taken;

Figure 6 is an exploded view of the potentiometer, and illustrates the manner in which the several parts are assembled after the continuous contact-supporting ring portion has been separated from its assembly, as shown in Figure 4;

Figure 7 is a sectional view of parts of the potentiometer in its inverted position, to illustrate the position of the pendulous member when seated against the stop screw at the top of the housing, and the position of the pendulum weight against the insulating liner, which is intended and serves to keep the pendulum weight from direct physical contact with the individual contact elements;

Figure 8 is an enlarged sectional view of parts of the potentiometer, illustrating the manner in which the pendulum weight is similarly kept from physically engaging any one of the associated contact members when the pendulum is caused to swing or deviate from its true vertical position; and Figure 9 is a diagram of the electrical circuit controlled by the pendulum potentiometer to control the energization of the vertical erecting motors for the gyro, which are to be controlled by the pendulum potentiometer in the application herein illustrated.

As shown in the drawings, and particularly in Figures 1 and 6, a pendulum potentiometer 10, symmetrical about a vertical axis, comprises a pendulous member or pendulum 11, pivotally supported from the top of a post 12, together with which it is enclosed in a protective housing 13 including a tube 14, a cover 15 and a cup 16.

The pendulum 11 includes and comprises a tube 21 having a bearing holder 22 anchored in position at the upper end of the tube 21 and supporting and holding a bearing 23 on its under side with a suitable bearing recess 24 symmetrically centered with respect to the tube 21 to enable the pendulum to automatically seat itself in proper symmetrical co-axial position on a pivot pin 25 at the upper end of the supporting post 12. The lower end of the pendulum tube 21 carries the pendulum weight in the form of a shell of inverted cup shape, having a side wall in the form of a circular cylindrical ring 26 and a top or annular dome 27. The circular ring 26 is formed to have both its outer diameter and its inner diameter accurately machined or otherwise formed to be symmetrically co-axial with the vertical axis through the supporting post 12 when the pendulum 11 is in its true vertical position.

The top or dome 27 of the shell 26 is provided with several holes or perforations 28 to permit free passage of the electrolyte and to prevent entrapment of any air bubbles within the shell 26, that might otherwise interfere with the operation of the pendulum. For the same reason, the vertical tube 21 of the pendulum is provided with several perforations 29 near its top end to permit free passage of the damping fluid and electrolyte, if and when the potentiometer should become completely inverted for any reason, as might result from the tumbling of the associated gyro, for example, from its normal vertical operating position, when it is stopped after an operating run.

The center supporting post 12 is arranged to be disposed symmetrically along the axis of the potentiometer in the true vertical position, and, as shown, comprises a main body or shank of uniform outside diameter, having the pivot pin 25 anchored in its upper end, and having its lower end portion 31 of reduced diameter to serve as an anchor portion to be rigidly anchored co-axially in a central boss 32 in the bottom cup 16. The anchoring portion 31 may be press-fitted into the boss 32 or it may be slip-fitted into the opening of the boss 32 and then soldered in position to provide a rigid anchoring.

The cover 15 and the cup 16 are arranged to be tightly closed and hermetically sealed, around the rim of the cup housing for the pendulum. The entire housing thus formed is filled with a damping fluid. As previously explained, the cup 16, the cover 15 and the vertical tube 14 constitute a protective housing for the pendulum. The entire housing thus formed is filled with a damping fluid, to dampen vibrations of the pendulum. The fluid also serves as an electrolyte to transmit current between selected points within the cup, as will be described.

For operation of the potentiometer, the outer tube 14 is filled with the electrolyte to a level near the top to leave only sufficient space to permit expansion of the fluid during the normal operating temperature range, without generating internal hydraulic pressure forces against the walls of the entire receptacle due to such expansion.

For the purpose of filling the vessel after the parts are entirely assembled, the top of the outer tube 14 is provided with a small filling tube 34. The filling tube 34 extends through a closure plug 35, which is suitably anchored at the top of the outer tube 14 by a bottom shoulder 36 and a solder joint around the edge at the top of the outer tube 14. A set screw 38 is co-axially disposed in the closure plug 35, at the top of tube 14, to serve as limit stop for the pendulum whenever the potentiometer becomes inverted. The manner in which the stop operates under those conditions is indicated more in detail in Figure 7.

When the housing is filled with the damping electrolyte, and exhausted, the small filling tube 34 is suitably pinched off and sealed.

In order to insulate the electrolyte, which is used primarily for its conductive characteristics and qualities as well as for its damping qualities, the inner surfaces of the cover 15 and of the cup 16 are protected by liner layers of insulating material, which is in this case the material commercially known as Mycalex. This material is formed onto the under side of the cover 15 which is provided with suitable cavities 40 and 41 to receive the material and to anchor it in place, once it is applied and cured in position, to become a hard cover 42. Similarly, an insulating liner 43 is provided for the cup 16.

This liner 43 is similarly formed in position on the inside of the cup 16, and is bonded to the metal and anchored in predetermined position by suitably formed tenons 44 of the material, that fit into the grooves 45 in the side wall 46 of the cup and in the side wall of the inner boss 32 that supports the main post 12.

Prior to and during the application of the material for forming the liner 43 in the cup 16, the contact elements are suitably positioned and supported on the cup, so they will be firmly anchored in place in the liner material and be accurately aligned, when the liner material is cured and hardened in place.

As shown in Figure 2, the contact elements are originally parts of an accurately machined or formed cylinder. The cylinder is then further machine or otherwise formed to constitute the contact assembly 50, which then consists of a cylindrical top ring portion 51, and four contact portions 52, 53, 54 and 55, which are also parts of the original cylinder and the spaces 56 between them. The cylindrical ring 51 is to be removed after the contacts are firmly anchored in place in the insulating liner 43 in the cup 16.

Each of the contact segments 52, 53, 54 and 55 is then provided with a small boss 57 that is internally threaded to receive a threaded pin terminal 58, which will presently be described.

The manner of assembling the contact assembly 50 into the cup is generally indicated in Figure 3. The contact assembly 50 is supported in desired position relative to the cup 16, and the insulating liner material that is to be the liner 43 is applied and formed. The terminal contact segments then remain firmly anchored in place with the contact ring 51 in exact co-axial alignment with the axis of the cup. The top ring portion 51 may then be removed. The contact segments 52 to 55, inclusive, will remain anchored in their assigned positions, with their front face surfaces arcuately concentric with the cup axis.

The operation and effect of removing the top ring portion 51 is generally indicated in Figure 4, and shows the parting line at which the top ring portion 51 is removed to leave the contact segments 52 to 55, inclusive, separately spaced and both electrically and mechanically independent and anchored in the lining material 43 that has been formed to be integral with and anchored to the cup 16.

Since the liner material 43 is an insulating material, the several contact members are thus insulated from each other except through the electrolyte that is used to fill the potentiometer housing. The electrolyte has a normally high resistance, of the order of 6,000 ohms per cubic centimeter. Its presence in the cup between the contact members is therefore not short-circuiting.

As shown in Figures 1, 3 and 4, the liner material 43, when formed, is provided with four outer side wall openings 60, to be in co-axial alignment with the internally threaded passages 61 in the bosses 57 on the respective contact members 52 to 55, inclusive. For clearness, upper portion of the side wall of the cup 16 is omitted in Figures 3 and 4.

Access may thus be had to the four contact members, in order to insert a pin contact terminal 58 into each of the respective bosses 57 of the contact members, through aligned openings or port-holes 62 in the side wall of the cup 16. Those port-holes 62 are originally formed in the cup side wall at appropriate locations, spaced at right angles from each other, and serve to locate the proper position for the contact ring assembly 50 during formation of the insulating liner 43 in the cup 16.

The pin contact terminal 58 is supported by an insulator, consisting of a surrounding disc body of insulating material, which in this instance is shown as a glass disc or bead 63 that is bonded to the surface of the pin terminal 58 to provide a hermetic seal along the pin. The outer surface of the glass disc or bead 63 has a metal supporting rign 64 bonded thereto, also by a hermetic seal bond. The supporting ring 64 consists of a ring or tubular body, and a transverse annular flange 65. The tubular body 64 is bonded to the peripheral surface of the bead 63, and the flange 65 is used to seat against the adjacent outer surface of the cup 16 around the rim of the port hole 62, to permit a solder joint and hermetic seal to be formed between the flange 65 and the surface of the cup 16 to hermetically seal the port 62. A similar through pin terminal is applied to each contact member 52 to 55, inclusive, and to seal the corresponding port 62.

The cup 16 is now completely formed and ready to be assembled with the other elements of the potentiometer, in the manner illustrated in Figure 6, which shows an exploded view of the elements ready for assembly.

All of the elements in Figure 6 have already been described except two sealing washers to prevent the electrolyte from seeping out to engage and erode the pin terminal 58. One sealing washer or gasket 67 seats on a top shoulder 68 at and within the rim edge of the cup 16, and on the adjacent top surface of the liner 43. A shoulder 68-a on the under side of the cover 15 and the adjacent surface of the insulating liner 42 of the cover 15 engage the top of the washer 67. The manner in which the washer 67 fits in between the cup and the cover is illustrated in Figures 1 and 7. For clearness of illustration, a narrow space separation is shown on the underside of washer 67 in Figure 1. The washer or gasket 67 is electrically insulating and preferably has some degree of resiliency and compressibility. A washer of polytetrafluoroethylene commercially known as Teflon, has been found quite suitable for this application.

A similar sealing washer 67-a of the same material Teflon, is disposed in each port 62 around the shank of each pin terminal 58, between the back of the insulating disc on bead 63 and the adjacent outer side wall surface of the liner 43 in the cup 16, as shown in Figures 1, 6 and 7. Each washer 67-a provides additional sealing protection for its associated terminal pin.

When the cover 15 and the cup 16 are closed in their assembly with outer tube 14, to constitute the closed housing for the electrolytic fluid and the pendulum 11, the pendulum will be seated with its bearing or jewel on the pivot pin 25 of the center post 12, and the bottom edge of the pendulum cup 26 will be but a short distance above the floor of the compartment or space 72 for the electrolyte within the liner 43 in the cup 16.

In the arrangement shown in Figure 1, the pendulum is in its true vertical position, at which the true vertical axis of the pendulum is coincident with the axis of the supporting post for the pendulum. In such true vertical position of the pendulum, the outer surface of the pendulum cup 26 will be equi-distant from the front surface of each of the four contact members, 52 to 55, that are anchored and supported in the cup liner 43.

The resistance across each respective gap between the pendulum cup 26 and each of the respective contact members 52 to 54, will normally be equal, when the pendulum is in true vertical position. When the pendulum swings from such true vertical position, the decrease in resistance of one, or of two, of those gaps, between the pendulum cup 26 and the contact members, is utilized to control the external circuits for energizing the vertical erecting motors in the appropriate directions to restore the gyro and the potentiometer to true vertical position.

In order to prevent the pendulum cup from physically engaging any one of the contact members, whenever the pendulum deviates from its true vertical position, a stop surface 69 is formed in the insulating liner 43 to rise from the floor of that liner directly in front of and slightly in advance of the cylindrical plane that defines the locus of the front surfaces of the four contact members 52 to 55, inclusive. The locations of said stop surface 69 and the manner in which it functions are shown more fully in Figures 7 and 8. As there indicated, the pendulum cup 26 is stopped to be in a position where it is substantially parallel to the front arcuate surface of the associated contact 52, for example, with a minimum gap between the pendulum shell and the contact 52 to reduce the gap resistance to a minimum, while yet keeping the pendulum cup out of direct physical contact with the contact member 52.

In Figure 7 is illustrated the construction whereby the pendulum falls away from its pivot pin 25, and drops onto the stop screw 35, when the potentiometer unit is completely inverted. The stop screw 38 is adjustably positionable within its supporting plug 35, to enable the pendulum to drop through a short distance without permitting the bottom rim edge of the pendulum cup 26 to fall below the edge of the shoulder of the stop surface 69. Thus, under those conditions, the pendulum cup is prevented from directly engaging the metallic contact members 52 to 55, inclusive.

However, in certain modifications, where contact is desired, for fast restoring action, after upsetting, the stop screw 38 may be suitably adjusted. In either case, the screw serves as a pivot.

After the potentiometer device is assembled as in Fig. 1, from the relative arrangement shown in Fig. 6, the cap or cover 15 and the cup 16 are held together tightly until a soldered closing ring 71 is formed by application of solder in and around a peripheral V-shaped groove defined by and between the peripheral flange edge faces 71-a of the cap 15 and of the cup 16. The cap 15 is shown provided with a rim edge 73 which serves as the flange for this tightening purpose, and the cup 16 is provided with a similar flange 74 for that purpose. After the solder ring 71 is applied to establish a hermetic seal between the cap 15 and the cup 16, four sets of C-clamps 75 are applied to grip the two flanges 73 and 74 of the cover or cap 15 and the cup 16, respectively, in the manner illustrated in Figs. 1 and 5.

As further shown in Fig. 5 the cap 15 is provided with four equally spaced lugs 77, by means of which the potentiometer unit may be suitably supported on a plate or platform that serves as the mechanical support for physically relating the potentiometer to the gyro with which the potentiometer is to work.

For introducing the electrolyte after assembly, the top plug 35 of the outer enclosure or housing tube 14 is provided with the filling tube 34, already referred to.

After the electrolyte is introduced into the housing to the desired level, and then exhausted, the filling tube 34 is pinched tight and hermetically sealed. In the filling operation, the housing is filled to at least above a certain desired level near the top. A hypodermic needle of predetermined length is extended into the housing with the eye of the needle at the desired level, and the excess electrolyte is extracted, to leave an empty space of exact volume.

As previously indicated, one application to which this potentiometer is here shown applied, is for the control of a gyroerecting system, somewhat similar to that shown in U. S. Patent 2,516,912 issued August 1, 1950, to Reichel and Emerson.

The potentiometer is mounted on and with the gyro, and the pendulum serves as a vertical seeking element, relative to the earth, to control the gyro and its support, such as a platform, for example, to maintain a desired horizontal position relative to the earth. For that purpose, the potentiometer, as heretofore described may now be simply considered as one having its resistor in the form of an electro-conductive liquid and its equivalent sliding contact in the form of the conductive pendulum immersed in the body of said liquid electrolyte. The pendulum has a certain limited freedom to swing within such liquid resistor, and, thereby to change the effective resistance values of the arms of the potentiometer as set up in the electrolyte between the four contacts 52 to 55 inclusive. Each path between the respective pairs of contacts is thus effectively continuous and functions as a potentiometer resistor.

The electrical control system including the potentiometer and the gyro is shown schematically in Fig. 9. The potentiometer functions are indicated by two potentiometer resistors 81 and 82 and by a common contact 83 representing the movable contacts. The potentiometers 81 and 82 represent the total path resistances of the gaps between the respective pairs of contacts 52 and 54, and 53 and 55. The common terminal 83 for the indicated movable contacts represents the pendulum bob 11 as the free contact that is grounded to the metal casing of the device.

In such a system, the gyro 84 is mounted on suitable gimbals for movement about respectively normal axes, shown in Fig. 9 as A and B. Two erection motors 85 and 86 are schematically indicated, that are utilized and disposed to apply the appropriate precessing torques to the gimbals, about those respective axes.

The precessing motor 85 is shown provided with two separate phase windings 87 and 88 to constitute a two-phase motor. The winding 87 provides a constant excitation field, and the winding 88 is a double or two-part winding to provide a directional control field. Thus the motor 85 may be selectively controlled to rotate in either direction, according to which part of winding 88 is predominantly energized.

The other erection motor 86 is similarly provided with two windings 89 and 90, by means of which that motor 86 similarly may be caused to rotate in one direction or the other, depending on which part of the two-part winding 90 is predominantly energized.

Energy for the system is supplied from one phase 92 of a suitable supply circuit through a transformer for the two exciting windings 87 and 89. A second phase 93, preferably quarter-phase relative to phase 92, supplies the energy for the directional-control windings 88 and 90.

When the system is properly centered and the supporting plate for the pendulum potentiometer is in a horizontal plane, the pendulum bob is in its neutral or exact vertical position, and the take-off terminal point 83 is at the neutral points of the respective potentiometer resistors 81 and 82 that are schematically illustrated in Fig. 9. Under those conditions, the current from phase 93 of the supply source divides equally between the two sub-paths that make up each total path represented by the respective potentiometer resistors 81 and 82.

The associated motor windings 88 and 90 connected to the respective potentiometer resistors are likewise traversed by equal currents through both parts of each winding from phase 93. The effects of those motor windings 88 and 90 on their rotor elements in the associated respective motors 85 and 86 under such conditions, are balanced, and no rotation of the rotors occurs.

As soon as the pendulum bob shifts from neutral position for example, in the case of the potentiometer 81, and assuming the bob to move in a direction such that the contact 83 would move to the left-hand side toward the contact terminal 52, the lowered resistance in the gap of the electrolyte at that contact 52 would correspond to lowered resistance between the take-off point 83 and the terminal 52 with a corresponding increase of current through terminal 52 and upper part of winding 90 and with a corresponding decrease of current through terminal 54 and lower part of winding 90.

As a result, the upper part of winding 90 would be more effective than the lower part of winding 90. The previous balanced effects between the two windings would be upset. The differential effect would be in the direction of the force exerted by the upper part of winding 90 and the rotor of the motor 86 would then turn in a direction controlled by the upper part of winding 90, in the angular direction around the axis B of the motor 86, to angularly shift the position of the corresponding gimbal until the true vertical position of the pendulum would be restored by re-establishing the horizontal position of the supporting plate for the potentiometer.

If the position of the pendulum bob, when moved out of its natural position, has a component of displaced position along both of the paths through the electrolyte, between the two pairs of contact terminals, then the pick-off point represented by the bob will effectively be shifted along both of the paths, as represented by the respective potentiometer resistors 81 and 82, to cause an unbalance that would affect one part of each directional winding of each motor more than the other part of that winding. In that case, both motors 85 and 86 would operate around their respective axes to re-adjust the position of the associated gimbals to restore the platform back to a horizontal position to re-establish the vertical position of the pendulum.

The ground shown on terminal 83 is established through the electrolyte between the outer tube 13 and the pendulum tube 21. Close spacing between those two tubes keeps the resistance low.

A feature of this potentiometer device is the adjustment screw 38 which serves both as a limit screw and as a pivot in the inverted position of the device, when the pendulum seats on the screw. The end of the screw is appropriately shaped, for example, as by being rounded, to minimize the friction for pivotal operation, to permit fast restoral and erection of the potentiometer from inverted position.

What is claimed is:

1. A pendulous potentiometer comprising a cup of electrically conducting material; a lining of insulating material to outline and define an annular chamber as a well to receive a current-conducting electrolyte; two pairs of diametrically opposed contacts co-ordinately disposed and supported on the insulating material, with the faces of the contacts flush with the wall of the material in a cylindrical plane concentric with the axis of the cup; a center post co-axially disposed and supported on the cup, and having a pivot support on its top end; and a pendulum pivotally supported from the pivot support at the top of the center post, said pendulum comprising a shell bob with a cylindrical body concentric with the cup axis and depending into the annular well to dispose its outer peripheral surface uniformly equidistant from the contact surfaces when the pendulum is in true vertical position.

2. A pendulous potentiometer comprising a metal cup having a vertical axis; a co-axial lining of insulating material formed substantially as a volume of revolution of a figure of substantially U-shape around said axis, to provide and define a circular well between the two walls of the lining to hold a symmetrically concentric pool of electrolyte; two pairs of stationary contacts supported on said lining at diametrically opposed positions co-ordinately disposed; a pendulous contact embodying a cylindrical element and a co-axial pivotal support therefor for positioning the cylindrical element concentrically about said axis within the well in the true vertical position of the switch; a closure for the cup and the pendulous contact and means for making electrical connections to the pendulous contact and to the stationary contacts for connection to an external circuit.

3. A method of forming a pendulous potentiometer to comprise a cup having a vertical axis and a concentric well to receive an annular pool of electrolyte in which a pendulous contact may be immersed as a concentric ring to be equally spaced from two pairs of diametrically opposed contacts co-ordinately disposed on the cup to be part of the wall to limit and define the well, said method comprising the step of forming an insulating liner within the cup, and simultaneously shaping the liner to outline the concentric well with the contact members embedded in the lining to have the contact faces constitute part of the lining wall surface.

4. A method of forming a potentiometer of the character mentioned in claim 3, including the additional steps of shaping a metallic cylinder to embody two pairs of diametrically opposite arcuate segments connected to and axially extending from a common ring portion of the original cylinder, and anchoring the segments in the liner during the formation of the liner, and then removing the common ring portion to leave the segments electrically insulated from each other in said liner.

5. A pendulous potentiometer comprising a cup of electrically conducting material shaped around a central vertical axis and having two pairs of diametrically opposed openings co-ordinately disposed in its side wall; an insulating lining integrally formed thereon to outline and define an annular well to receive and hold a current-conducting electrolyte; two pairs of diametrically opposed terminal plates insulatingly supported on said liner in transverse coordinate relationship, with the faces of the terminal plates arcuately flush with the wall of the material defining the outer limit of the annular well; a terminal pin secured to each terminal plate and extending out through one of the openings in the side wall of the cup to be electrically free of the cup at that region; a support for each terminal pin, each such support being mounted on the cup for support and serving as a closure for the opening in the wall of the cup; an annular disc to serve as a co-axial partial cover for the cup; a tube co-axially and integrally secured to the annular disc to constitute with said disc a cap closure for the cup; a center post rigidly co-axially supported from within the cup and extending co-axially into said tube and having its top end conditioned to serve as a pivot; and a pendulum supported from said pivot, and including a bearing to seat on the pivot, a tube suspended from said bearing to be normally co-axial around said center post, and a cylindrical shell of enlarged diameter supported from the lower end of said suspended tube and dipping into said annular well as a movable electrode in the paths between the stationary terminal plates.

6. A pendulous potentiometer comprising a metallic cup co-axial about a vertical central axis; a metallic center post co-axially disposed with its lower end anchored to the bottom of the cup, and having a pivot bearing on its top end; an insulating liner anchored within the cup and shaped to define and outline an annular co-axial well to receive a conductive electrolyte; two pairs of diametrically opposed terminal plates co-ordinately supported on said insulating liner flush with a wall of the liner outlining the co-axial well; a pendulum suspended from the pivot bearing of the center post and including a cylindrical shell adapted to assume a concentric position in the annular well in the true vertical position; a closure for the cup, consisting of a cap for the cup and an enclosing tube for the center post and the pendulum suspension; and means for limiting the extent of movement of the pendulum from its pivotal support upon inversion of the entire potentiometer.

7. A pendulous potentiometer comprising a vessel having an annular chamber concentric about a central axis, to hold a current-conducting fluid electrolyte; a center post co-axially supported in said vessel and extending to a level above said annular chamber and having a pivot bearing point co-axially disposed on its upper end; a pendulum supported from said bearing point on the center post and embodying a co-axial cylindrical weight element depending into the annular chamber to serve as a pick-off terminal in the electrolyte; one or more pairs of diametrically opposed stationary terminal elements insulatingly supported on the wall of the vessel to be in engagement with the electrolyte and having individual connectors extending through the wall of the vessel for connection to external circuits; a closure for the vessel, including a cap for the vessel with a closed tube sealed at its lower end around an opening in the cap and extending up around the center post to enclose the post and the pendulum within the vessel and the closure; and means for limiting the separation of the pendulum from its pivotal point support upon inversion of the potentiometer.

8. A pendulous potentiometer comprising a vessel having a chamber symmetrical about a vertical axis to receive a charge of fluid electrolyte; terminal elements insulatingly supported on the vessel to establish terminal points of potentiometer circuits through such electrolyte; a pendulum co-axially seated and pivoted for limited oscillatory motion within the vessel and in a plane containing the axis; a co-axially disposed pivot to support the pendulum normally; and adjustable means for limiting separating movement of the pendulum from its pivot upon inversion of the potentiometer, and to serve as an auxiliary pivot during such inversion.

9. A pendulous element for use as a pendulum and movable contact in a fluid potentiometer, said element consisting of a hollow shell cylindrically symmetrical about a longitudinal axis, and embodying a length of a cylinder of a small diameter to serve as a suspension, and a length of a co-axial cylinder of larger diameter mechanically joined thereto to serve as a pendulum bob at the lower end of the small cylinder, the upper end of the cylinder of small diameter being closed to provide a seat for a pivot.

10. A pendulous element as in claim 9, in which the bob element cylinder is joined to the suspension cylinder by an annular section of truncated cone shape.

11. A pendulous element as in claim 10 in which the inclined annular section is provided with one or more openings to permit free passage of fluid through said annular section and to prevent entrapment of air bubbles under said section.

12. A pendulous element as in claim 10, in which both the suspension cylinder and the inclined section are provided with openings to permit free passage of fluid through the pendulous element as a whole, thereby to limit the possibility of bubble entrapment within the pendulous element.

References Cited in the file of this patent

UNITED STATES PATENTS

| | | |
|---|---|---|
| 1,463,453 | Werner | July 31, 1923 |
| 2,665,497 | Bates | Jan. 12, 1954 |